Figure 1:
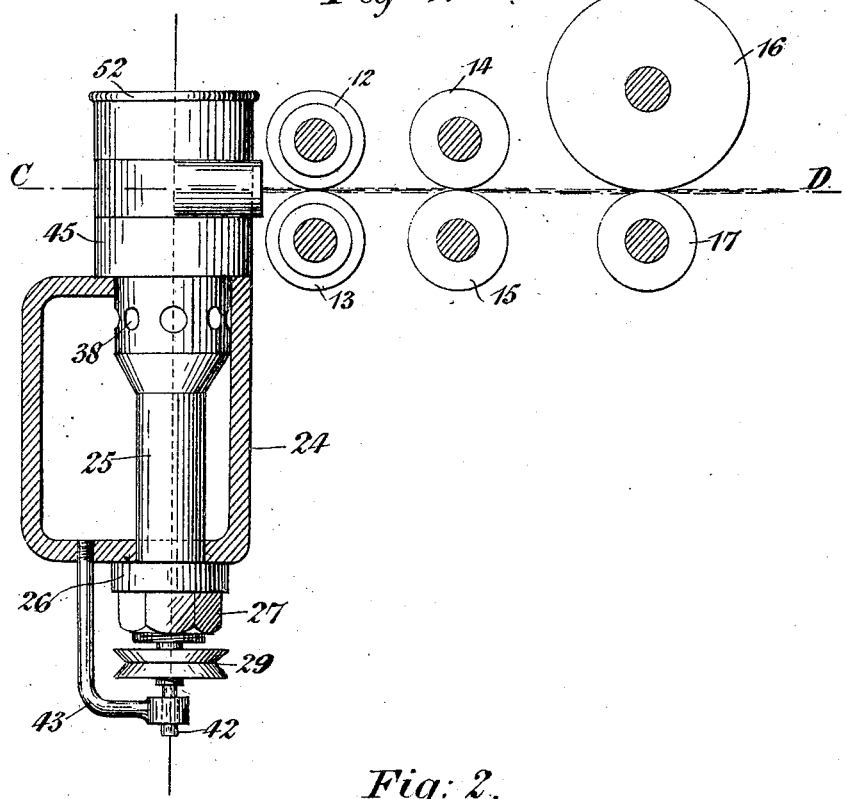

No. 800,012. PATENTED SEPT. 19, 1905.
W. A. PHILLIPS & F. HUTCHINS.
METHOD OF COVERING THREAD, WIRE, AND OTHER CORES.
APPLICATION FILED FEB. 23, 1904.

5 SHEETS—SHEET 1.

Witnesses:
John Brown.
C. D. Kesler.

Inventors
William A. Phillips
Frederick Hutchins
By James L. Norris.
Atty.

No. 800,012. PATENTED SEPT. 19, 1905.
W. A. PHILLIPS & F. HUTCHINS.
METHOD OF COVERING THREAD, WIRE, AND OTHER CORES.
APPLICATION FILED FEB. 23, 1904.
5 SHEETS—SHEET 2.
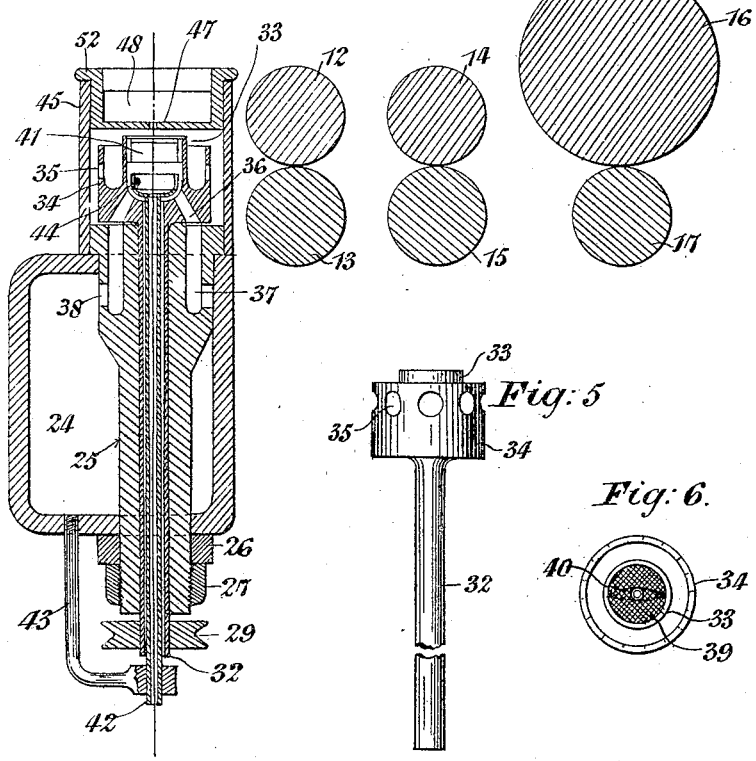
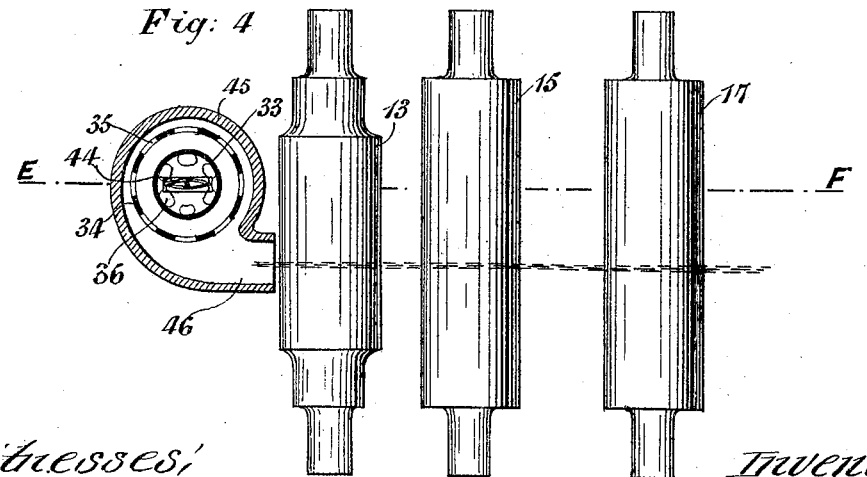
Witnesses:
John Brown
C. L. Kesler
Inventors
William A. Phillips
Frederick Hutchins
By James L. Norris
Atty

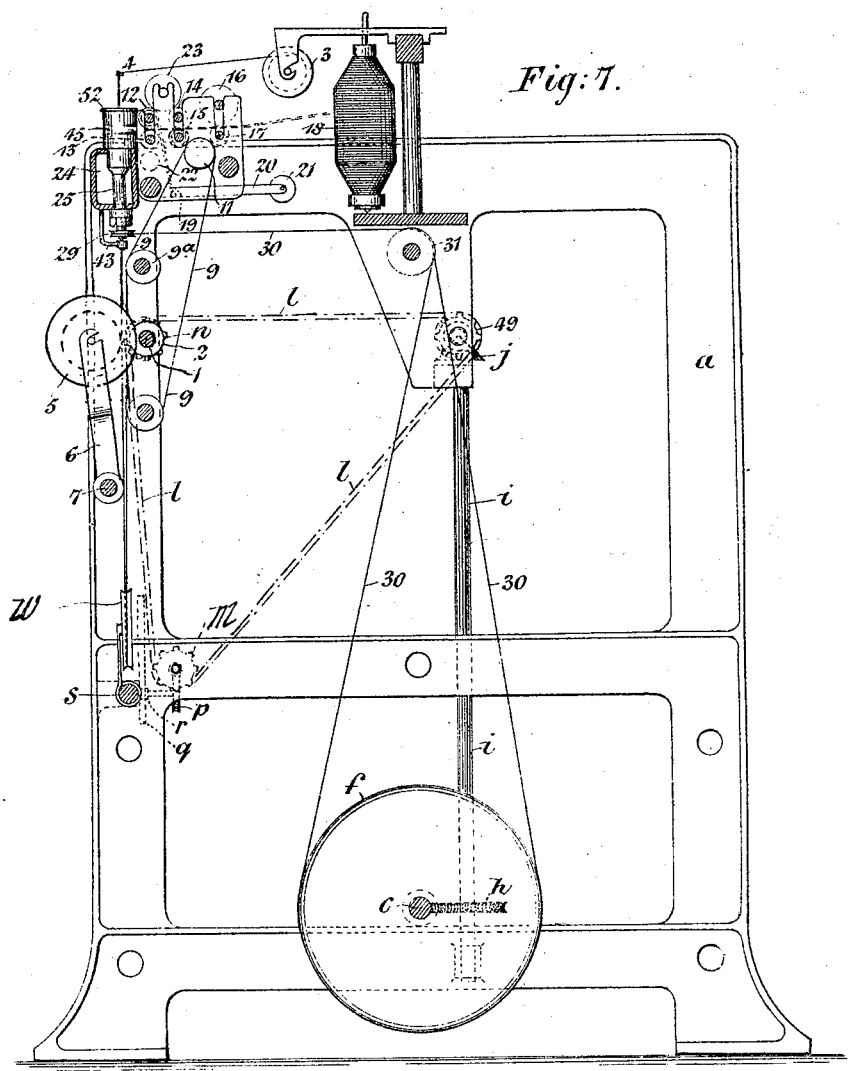

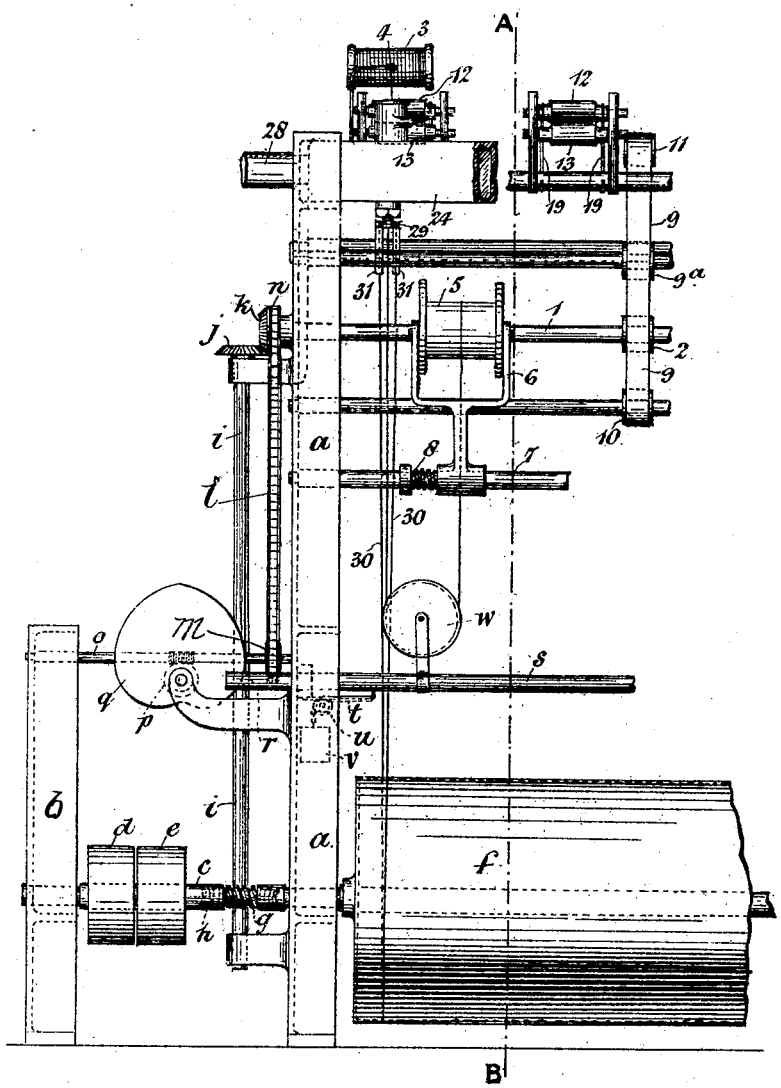

No. 800,012. PATENTED SEPT. 19, 1905.
W. A. PHILLIPS & F. HUTCHINS.
METHOD OF COVERING THREAD, WIRE, AND OTHER CORES.
APPLICATION FILED FEB. 23, 1904.

5 SHEETS—SHEET 5.

Witnesses
John Brown
C. D. Kesler

Inventors
William A. Phillips
Frederick Hutchins
By James L. Norris
Atty.

UNITED STATES PATENT OFFICE.

WILLIAM ALFRED PHILLIPS AND FREDERICK HUTCHINS, OF LONDON, ENGLAND; SAID PHILLIPS ASSIGNOR TO SAID HUTCHINS.

METHOD OF COVERING THREAD, WIRE, AND OTHER CORES.

No. 800,012.     Specification of Letters Patent.     Patented Sept. 19, 1905.

Application filed February 23, 1904. Serial No. 194,865.

*To all whom it may concern:*

Be it known that we, WILLIAM ALFRED PHILLIPS and FREDERICK HUTCHINS, electrical engineers, subjects of the King of Great Britain, residing at 185 Oxford street, London, England, have invented certain new and useful Improvements in Methods of Covering Thread, Wire, and other Cores, of which the following is a specification.

In existing methods and machinery for covering a wire or other core, thread, or central formation with fibrous material—such as cotton, silk, paper, or the like—use is made of a yarn, thread, or strip of cotton, silk, or other material, which is wound spirally around the core, said yarn or thread being always continuous from the point of supply to that of application on the core. In some such methods, at least if the core-thread is not rotated, the enwrapping-threads and their sources of supply rotate relatively to the core.

The present invention relates to the covering of wire or other cores with cotton or other fibrous material. The wire or core-thread so to be covered may be such as is commonly employed for electrical uses, or it may be in rod form in the nature of stranded cable or in the forms of a roving, yarn, thread, cord, or other continuous filament, and this we shall call the "core." The covering material may be cotton, silk, (such as wild or waste silk,) rabbit's wool, or other fiber in the form of a sliver or roving or untwisted or very slightly-twisted band of fibers. The material employed for covering is essentially in an untwisted or unspun condition, and preferably is in the form of a fine roving—that is to say, in a band of parallelized fibers. This material in band, sliver, or roving forms the source of supply for the covering of the core; but as such it has no continuity of structure or connection with the fibers separated therefrom, as will be described, while such fibers are being enwrapped upon the core.

In carrying the invention into practical effect we have devised an apparatus such as is illustrated by the accompanying drawings, wherein—

Figure 2:
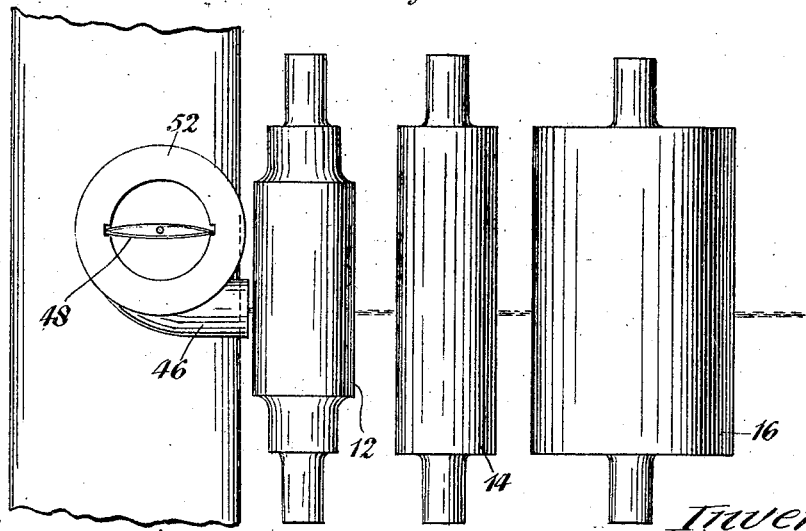
Figure 9:
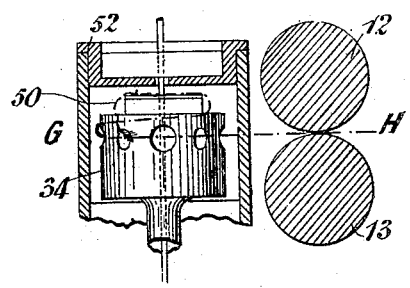
Figure 11:
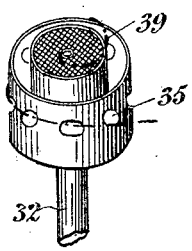
Figure 10:
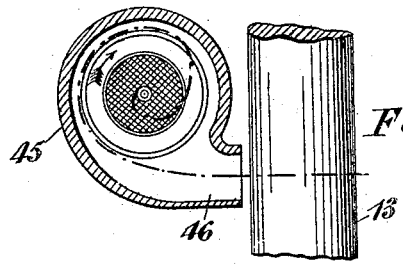
Figure 12:
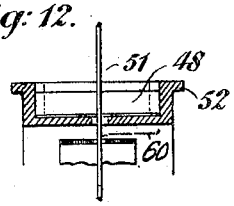
Figure 13:
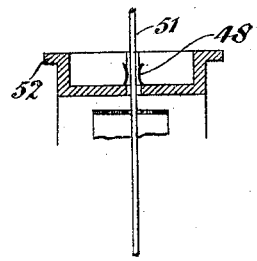

Figure 1 is a vertical elevation of the spindle bearing, casing, and cover, together with other accessory parts. Fig. 2 is a plan of the same. Fig. 3 is a vertical section through E F in Fig. 4, which is a horizontal section through C D in Fig. 1. Figs. 5 and 6 are respectively an elevation and a plan of the spindle. Fig. 7 is a vertical elevation through the line A B in Fig. 8, which is a front elevation of a part of the machine. Fig. 9 is a vertical sectional diagram through the spindle casing and cover, the spindle-head being shown in elevation. Fig. 10 is a horizontal sectional diagram through the line G H in Fig. 9, except that the spindle is shown in plan and not in section. Fig. 11 is a diagrammatic perspective view of the spindle-head, showing the gauze top. Figs. 12 and 13 show sectional views taken at right angles one to the other of details.

The three diagrammatic Fgs. 9, 10, 11, are intended to make clearer the path taken by the stream of fibers, as shown by the dotted line. The path taken by the air is practically the same as that taken by the fibers, except that some air passes through the holes 35 in the outer ring of the spindle on its way to the gauze, as shown by the arrow 50 in Fig. 9. Owing to the relative speed of rotation of the ring and the fibers, none of the fibers, however, go through these holes in the outer ring. As a result of the air passing through these holes, the fibers of cotton or other material being used are sucked against the surface of the outer ring, and the edges of the holes tend to separate any fibers which might otherwise cling together. The spindle rotates at a rapid speed, and the edges of the holes have, as it were, a parallelizing and beating action upon the fibers. The result of the draft of air combined with the rotation of the spindle is the production of a kind of vortex which impels the fibers toward the central hole in the gauze, as indicated by the dotted line.

In Fig. 12 the dotted line 60 represents a single fiber, the leading end of which has just touched the wire 51. The air vortex causes this fiber to be spun round, so that it is made to wind itself in a spiral on the wire if the latter is drawn down at the same time, as shown in Fig. 13. A constant stream of fibers will of course give a continuous covering.

Three sets of springs 48, 41, and 44 (see Figs. 3, 12, and 13) are provided, all of which consist of strips of steel. The function of the upper fixed pair 48 is to steady a fine-wire or other core, if such is used, close down to the point of covering; but this pair of springs is not required for large wires, as their stiffness enables them to keep their position. The function of the lower fixed springs 44, which are used when dealing with fine core material only, is to restrict the twist induced by the action of the rotating springs 41. The function of the springs 41, which rotate with the spindle, is to consolidate the covering.

It is possible to obtain the covering action without any springs; but the covering is then apt to be in a loose uncompacted condition, and in case the power of the air vortex is insufficient by itself to wind the fibers tightly enough round the wire to form a solid covering this device insures the desired result.

The portion of a machine as shown by Fig. 8 is for the convenience of the drawings restricted to two spindles only. The machine has two standards $a$, only one of which is shown, and a supplementary standard $b$. $c$ is the main shaft driving the machine by the fast and loose pulleys $d$ and $e$. $f$ is a drum for driving the spindles. A worm $g$ on main shaft $c$ drives a worm-wheel $h$, spindle $i$, bevel-wheels $j$ $k$, the latter driving by chain $l$ three sprocket-wheels $m$, $n$, and 49. (See Fig. 7.) The sprocket-wheel $m$ is fixed on spindle $o$, having a worm driving a worm-wheel $p$. The latter is on the same spindle as the cam $q$, which operates the pin $r$ in a sliding shaft $s$, which pin $r$ is kept to its work in contact with the said cam by a chain $t$ passing over a pulley $u$ and drawn upon by a weight $v$. The shaft $s$ carries guide-pulleys $w$, one for each spindle, thereby giving traverse motion.

Wire to be covered passes from bobbin 3 through the eye 4, Fig. 7, thence through the covering-spindle round the guide-pulley $w$ onto the bobbin 5, which is mounted in a rocking arm 6, supported on a fixed spindle 7. The torsional spring 8 presses the bobbin 5 toward the roller 2.

In Fig. 8 the extreme left-hand spindle and bobbin 5 are shown in elevation. The right-hand portion of the figure shows the gearing between the pull-off shaft 1 and the drawing-rollers. The sprocket $n$ on shaft 1 operates the bobbin by means of the roller 2. Between 5 and 2 is an endless band 9, passing over two loose pulleys $9^a$ and 10, thereby driving pulley 11 when the bobbin 5 is pressed toward the roller 2; but when the bobbin is pulled away from the roller 2 the endless band 9 stops, thus stopping the bobbin and the drawing-rollers. The shaft 1 works the various sets of bobbins and drawing-rollers by means of a series of bands 9. A gear-wheel fastened to 11 drives by suitable gearing the drawing-rollers 12, 13, 14, 15, 16, and 17, the gearing being such that the front rollers run faster than the middle pair and the middle faster than the back rollers.

18 is a bobbin of covering material, the roving from which passes through the rollers, as shown in Figs. 1 and 2.

The drawing-rollers may be of the usual kind used in existing spinning-machines. In Fig. 7 the front top rollers are shown weighted, by means of two links 19 19, with two levers 20 and a weight 21.

22 23 are clearing-rollers.

24 is a box-girder extending across the machine and carrying the covering-spindles. The rotating spindles are carried in bearings 25, which are secured in 24 by washer 26 and nut 27. The interior of 24 is connected by pipe 28 (see Fig. 8) with a vacuum-fan. (Not shown.) The spindle is driven by pulley 29 from the drum $f$ by means of band 30, which passes over two loose pulleys 31. The spindle consists of a hollow tube 32, having a head provided with two concentric rings 33 34, the latter having a series of holes 35. The bottom of the spindle-head has a ring of holes 36, so that the partial vacuum in 24 causes air to pass down through the holes 36 into the circular channel 37 and through the ring of holes 38. The inner ring 33 is provided with a gauze top 39, having a hole in the center 40, which may be conveniently formed by means of an eyelet. Immediately below the gauze are two flat springs 41, rotating with the spindle 32. Inside the hollow spindle is a tube 42, held by the bracket 43 so as not to rotate and provided at the top with two flat springs 44, similar to 41. Surrounding the spindle-head is a fixed casing 45, as shown in Figs. 1, 3, and 4, having an opening 46. The casing 45 is closed at the top by 52, which has a flat bottom 47, having a hole in the center. (This piece can be coned instead of flat.) 52 carries two flat springs 48.

In operation one end of a sliver or roving of fiber, such as cotton, is conveyed to a pair of delivery-rollers 12 13 or pairs of delivery-rollers, with a certain amount of draft arranged to be given to the roving in its passage between them, if so desired, and from these delivery-rollers or other suitable rapidly-rotating bodies the end of the roving is carried past a head or other convenient rapidly-rotating device provided with holes 35, the edges of which arranged around its periphery act as stroking and beating means. The spindle-head rotates in a casing 45, arranged so that the edges of the holes 35 on the side of the head next the line of fibers just strike the same and assist in separating those fibers, which thence pass to the wire-gauze or reticulate covering-surface 39, which, as part of the spindle-head, is very rapidly rotated. This gauze 39 has a central opening 40 therein, and otherwise than at this point the gauze covers the opening to the chamber in the hollow spindle 32, carried in suitable bearings 25. In this casing 45 is created a partial vacuum by a fan connected with the pipe 28, although of course the same result could be otherwise secured.

To direct the fibers and to concentrate or increase the effect of the current induced by partial vacuum or other convenient means, the upper portion of the casing 45 above the gauze 39 or a portion thereof is inclosed by the casing-cover 52, said cover 52 being relatively fixed, so as to form a casing in which the induced current of air therein is put into a state of rapid revolution by contact with the rapidly-revolving gauze cover 39, carrying with it the abstracted fibers. The part 47 of the casing concentrates the force of the induced current and helps direct it toward the central hole forming the outlet for the rapidly-rotated fibers, which have become spun around and uniformly cover the inclosed foundation.

The wire or other core 51 to be covered, suitably strained over carrying-pulleys, (not shown,) is fed from any suitable bobbin or source of supply and is led through an eye 4 to an opening in the cover 52 and then through the central hole 40 of the gauze plate 39, referred to, and through the tube 42 and then passes over the pulley $w$ to be wound on a bobbin 5 when covered. As this core 51 travels through the fixed cover 52 and through the central hole into the hollow head of the rotating spindle 32 it has no rotative motion, while the gauze-covered chamber in which the partial vacuum has been created is in rapid rotation around it. The effect is that air in the space above the gauze 39 is sucked therethrough after having been with great force drawn around the wire foundation or core, carrying with it the fibers of cotton or other fiber drawn from the roving, and the ends of these fibers become adherent to the wire or other traveling core and are wound in close spirals thereon and pass down into the chamber below, being in passing subjected to the rubbing, polishing, or evening and compacting action of a pair or other number of spring plates or fingers or to the action of equivalent smoothing and compacting means. The exhaust coöperates with the rotating spindle-head in assisting to separate the fibers from the roving and release them, so that they float in a separated condition as individual fibers in the air-current. Spring-pressing pieces, as shown, may be applied to the core above the gauze-line or may be omitted at that point, if desired.

Having now particularly described and ascertained the nature of our said invention and in what manner the same is to be performed, we declare that what we claim is—

1. A method of covering a core with fibers, which consists in forming a definite vortex of such fibers around and in intimate association with said core.

2. A method of covering a core with fibers, which consists in forming a vortex by suction of the fibers around and in intimate association with the core.

3. A method of covering a core with fibers, which consists in forming a vortex of the fibers around and in intimate association with the core, and in advancing said core with the fibers thereon.

4. A method of covering a core with fibers, which consists in forming a vortex of the fibers around and in intimate association with the core, and in subsequently compacting the fibers on the core.

5. A method of covering a core with fibers, which consists in drawing the fibers from the roving and in twisting them around and in intimate association with the core by a pneumatically-created vortex.

In testimony whereof we have hereunto set our hands in presence of two subscribing witnesses.

WILLIAM ALFRED PHILLIPS.
FREDERICK HUTCHINS.

Witnesses:
JOHN COODE WARE,
ERNEST JOHN HILL.